US007636647B2

(12) United States Patent
Alderman

(10) Patent No.: US 7,636,647 B2
(45) Date of Patent: Dec. 22, 2009

(54) EFFICIENT DESIGN PROCESS FOR THE ALLOCATION OF VARIABILITY TO NON-NORMALLY DISTRIBUTED COMPONENTS OF COMPLEX SYSTEMS AND FOR THE ESTIMATION OF THE SYSTEM RESPONSE PROBABILITY DENSITY

(75) Inventor: Jerry L. Alderman, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 69 days.

(21) Appl. No.: 11/688,327

(22) Filed: Mar. 20, 2007

(65) Prior Publication Data

US 2008/0234974 A1 Sep. 25, 2008

(51) Int. Cl.
*G06F 17/18* (2006.01)
(52) U.S. Cl. ...................................................... 702/181
(58) Field of Classification Search ......... 702/179–182, 702/186, 188, 189, 193, 194; 705/11, 35, 705/36 R, 37; 703/6; 455/265
See application file for complete search history.

(56) References Cited

U.S. PATENT DOCUMENTS 7,243,320 B2 * 7/2007 Chiu et al. ..................... 716/4

2005/0004833 A1 * 1/2005 McRae et al. ................. 705/11
2007/0038413 A1 * 2/2007 Mehta et al. ................ 702/189

OTHER PUBLICATIONS

Chaloner et al., "Bayesian Experimental Design: A Review", Statistical Science, 1995, vol. 10, No. 3, pp. 273-304.
Satish D. Kini, "An Approach to Integrating Numerical and Response Surface Models for Robust Design of Production Systems", Dissertation, The Ohio State University, 2004.
Packianather et al., "Optimizing the Parameters of Multilayered Feedforward Nueral Networks Through Taguchi Design of Experiments", Quality and Reliability Engineering International, 2000, pp. 461-473.
U.S. Appl. No. 11/530,491, filed Sep. 9, 2006, Alderman et al.

* cited by examiner

*Primary Examiner*—Edward Raymond
*Assistant Examiner*—Mohamed Charioui
(74) *Attorney, Agent, or Firm*—Renner, Otto, Boisselle & Sklar, LLP

(57) ABSTRACT

A method for implementing a point estimation method (PEM) that predicts variability of a system output response based on variabilities of inputs includes building a customized designed experiment such that each input variable x for the designed experiment is assigned a number of variable values n based on the respective input variable's contribution p to overall response variability.

37 Claims, 18 Drawing Sheets

| | |
|---|---|
| pvals(1, 1) = 1 | zvals(1, 1) = 0 |
| pvals(2, 1) = 1 / 2 | zvals(2, 1) = -1 |
| pvals(2, 2) = 1 / 2 | zvals(2, 2) = 1 |
| pvals(3, 1) = 1 / 6 | zvals(3, 1) = -Sqr(3) |
| pvals(3, 2) = 2 / 3 | zvals(3, 2) = 0 |
| pvals(3, 3) = 1 / 6 | zvals(3, 3) = Sqr(3) |
| pvals(4, 1) = 0.0458759 | zvals(4, 1) = -2.3341 |
| pvals(4, 2) = 0.454124 | zvals(4, 2) = -0.741964 |
| pvals(4, 3) = 0.454124 | zvals(4, 3) = 0.741964 |
| pvals(4, 4) = 0.0458759 | zvals(4, 4) = 2.3341 |
| pvals(5, 1) = 0.0112574 | zvals(5, 1) = -2.85697 |
| pvals(5, 2) = 0.222076 | zvals(5, 2) = -1.35563 |
| pvals(5, 3) = 0.533333 | zvals(5, 3) = 0 |
| pvals(5, 4) = 0.222076 | zvals(5, 4) = 1.35563 |
| pvals(5, 5) = 0.0112574 | zvals(5, 5) = 2.85697 |
| pvals(6, 1) = 0.00255578 | zvals(6, 1) = -3.32426 |
| pvals(6, 2) = 0.0886157 | zvals(6, 2) = -1.88918 |
| pvals(6, 3) = 0.408828 | zvals(6, 3) = -0.616707 |
| pvals(6, 4) = 0.408828 | zvals(6, 4) = 0.616707 |
| pvals(6, 5) = 0.0886157 | zvals(6, 5) = 1.88918 |
| pvals(6, 6) = 0.00255578 | zvals(6, 6) = 3.32426 |

Weights and Coordinate Values for n=1 to 6

FIG. 1

| V1 | V2 | V3 | V4 | V5 | V6 | # Exps | Rel Qual |
|----|----|----|----|----|----|--------|----------|
| 4 | 6 | 3 | 4 | 3 | 4 | 3456 | 1.000 |
| 4 | 6 | 3 | 4 | 3 | 3 | 2592 | 0.999 |
| 4 | 6 | 3 | 3 | 2 | 3 | 1296 | 0.997 |
| 3 | 5 | 2 | 3 | 2 | 3 | 540 | 0.992 |
| 3 | 5 | 2 | 3 | 2 | 2 | 360 | 0.989 |
| 3 | 5 | 2 | 2 | 1 | 2 | 180 | 0.986 |
| 3 | 5 | 1 | 2 | 1 | 2 | 120 | 0.982 |
| 3 | 5 | 1 | 2 | 1 | 2 | 60 | 0.978 |
| 2 | 4 | 1 | 2 | 1 | 2 | 32 | 0.965 |
| 2 | 4 | 1 | 2 | 1 | 1 | 16 | 0.956 |
| 2 | 4 | 1 | 1 | 1 | 1 | 8 | 0.944 |

Candidate Designs

FIG. 2

| Run Number | Response Value | Weight | A-Press | B-Temp | C-Fan Effic | D-Fan Dia | E-Fan Ratio | F-Mass Flow |
|---|---|---|---|---|---|---|---|---|
|  |  |  | 2 | 4 | 1 | 2 | 1 | 1 |
| 1 | 3471.8190 | 0.0115 | 0.9966 | 7.6510 | 0.8500 | 58.8547 | 1.7000 | 324.0000 |
| 2 | 3424.5755 | 0.0115 | 0.9966 | 7.6510 | 0.8500 | 59.1453 | 1.7000 | 324.0000 |
| 3 | 3680.7684 | 0.1135 | 0.9966 | 17.4592 | 0.8500 | 58.8547 | 1.7000 | 324.0000 |
| 4 | 3630.1652 | 0.1135 | 0.9966 | 17.4592 | 0.8500 | 59.1453 | 1.7000 | 324.0000 |
| 5 | 3880.8445 | 0.1135 | 0.9966 | 26.6008 | 0.8500 | 58.8547 | 1.7000 | 324.0000 |
| 6 | 3827.0059 | 0.1135 | 0.9966 | 26.6008 | 0.8500 | 59.1453 | 1.7000 | 324.0000 |
| 7 | 4101.2263 | 0.0115 | 0.9966 | 36.4090 | 0.8500 | 58.8547 | 1.7000 | 324.0000 |
| 8 | 4043.8048 | 0.0115 | 0.9966 | 36.4090 | 0.8500 | 59.1453 | 1.7000 | 324.0000 |
| 9 | 3412.2997 | 0.0115 | 1.0072 | 7.6510 | 0.8500 | 58.8547 | 1.7000 | 324.0000 |
| 10 | 3366.0049 | 0.0115 | 1.0072 | 7.6510 | 0.8500 | 59.1453 | 1.7000 | 324.0000 |
| 11 | 3617.4097 | 0.1135 | 1.0072 | 17.4592 | 0.8500 | 58.8547 | 1.7000 | 324.0000 |
| 12 | 3567.8226 | 0.1135 | 1.0072 | 17.4592 | 0.8500 | 59.1453 | 1.7000 | 324.0000 |
| 13 | 3813.8003 | 0.1135 | 1.0072 | 26.6008 | 0.8500 | 58.8547 | 1.7000 | 324.0000 |
| 14 | 3761.0427 | 0.1135 | 1.0072 | 26.6008 | 0.8500 | 59.1453 | 1.7000 | 324.0000 |
| 15 | 4030.1130 | 0.0115 | 1.0072 | 36.4090 | 0.8500 | 58.8547 | 1.7000 | 324.0000 |
| 16 | 3973.8446 | 0.0115 | 1.0072 | 36.4090 | 0.8500 | 59.1453 | 1.7000 | 324.0000 |

PEM Designed Experiment

FIG. 3

| 3 SIGMA Allocations When P, T Are Treated As If They Were Independent | | |
|---|---|---|
| Variable | Standard Deviation | % Contribution to Variance |
| A-Press | 0.0053 | 0.0361 |
| B-Temp | 6.1604 | 0.6046 |
| C-Fan Effic | 0.0087 | 0.0511 |
| D-Fan Dia | 0.3613 | 0.1440 |
| E-Fan Ratio | 0.0195 | 0.0412 |
| F-Mass Flow | 2.1467 | 0.1231 |

FIG. 9A

| 3 SIGMA Allocations When P, T Correlation Is Accounted for | | |
|---|---|---|
| Variable | Standard Deviation | % Contribution to Variance |
| A-Press | 0.0053 | 0.3590 |
| B-Temp(Indep part) | 5.2336 | 0.4397 |
| C-Fan Effic | 0.0065 | 0.0286 |
| D-Fan Dia | 0.2703 | 0.0807 |
| E-Fan Ratio | 0.0146 | 0.0231 |
| F-Mass Flow | 1.6061 | 0.0690 |

| | A | B | C | D | E | F | G | H | I |
|---|---|---|---|---|---|---|---|---|---|
| 1 | | | | | | | | | |
| 2 | PROGRAM: | | | R | | | | | |
| 3 | ANALYSIS DESCRIPTION: | | | | | | | | |
| 4 | ANALYST: | | | | DATE: 23-Jul-06 | | | | |
| 5 | | | | | | | | m Value for Allocation | |
| 6 | | | | | | | | 0.5000 | |
| 7 | | Mean Value | Calc Sens | Assigned +/- TOL | TOL % or Value? | Uniform Dist? (Y or N) | Keep Allocated Value? | Allocate Standard Deviations | Tolerance in σ's |
| 8 | Variable Name | | | | | | | | |
| 9 | Mean | 0.9969 | 5.60474E-05 | | | N | ☑ | 20.0962 | 3.0000 |
| 10 | Variance | 0.0000 | -4.79806E-07 | | | N | ☑ | 5211.6609 | 3.0000 |
| 11 | Skewness | -2.6921 | 0.010042908 | | | N | ☑ | 0.3244 | 1.7320 |
| 12 | Kurtosis | 13.7906 | -1.73468E-14 | | | N | ☑ | 0.6859 | 3.0000 |
| 13 | | | | | | | ☐ | | |
| 14 | | | | | | | ☐ | | |
| 15 | | | | | | | ☐ | | |
| 16 | | | | | | | ☐ | | |
| 17 | | | | | | | ☐ | | |
| 18 | Response = | 0.9500 | | | | | Response Mean | 0.99529105 | |
| 19 | Lower Spec Limit (LSL) = | | 0.0000 | | | | Actual Value = | 1.4175 | |
| 20 | Upper Spec Limit (USL) = | | 1.0000 | | | | Target Value = | | |
| 21 | | | | | | | | SIGMA Value ▼ | |
| 22 | | | | | | | | | |
| 23 | © 1998-2006, Raytheon Company | | | | NOTE: If AutoCalc is OFF. Always press the Allocate Standard Deviations button after making | | | | |

FIG. 10B

PEM JFit Sheet Showing 95% Confidence Interval that HP > 3250

FIG. 12A

|   | A | B | C | D | E | F | G | H | I |
|---|---|---|---|---|---|---|---|---|---|
| 1 | | | | | | | | | |
| 2 | Run Number | Response Value | Weight | A-Press | B-Temp | C-Fan Effic | D-Fan Dia | E-Fan Ratio | F-Mass Flow |
|   |   |   |   | 2 | 4 | 1 | 2 | 1 | 1 |
| 3 | 1 | 3433.7343 | 0.0115 | 0.9968 | 5.8214 | 0.8500 | 58.8456 | 1.7000 | 324.0000 |
| 4 | 2 | 3384.1816 | 0.0115 | 0.9968 | 5.8214 | 0.8500 | 59.1544 | 1.7000 | 324.0000 |
| 5 | 3 | 3661.8371 | 0.1135 | 0.9968 | 17.4963 | 0.8500 | 58.8456 | 1.7000 | 324.0000 |
| 6 | 4 | 3628.0477 | 0.1135 | 0.9968 | 17.4963 | 0.8500 | 59.1544 | 1.7000 | 324.0000 |
| 7 | 5 | 3895.5655 | 0.1135 | 0.9968 | 27.2510 | 0.8500 | 58.8456 | 1.7000 | 324.0000 |
| 8 | 6 | 3838.1030 | 0.1135 | 0.9968 | 27.2510 | 0.8500 | 59.1544 | 1.7000 | 324.0000 |
| 9 | 7 | 3984.7687 | 0.0115 | 0.9968 | 31.2452 | 0.8500 | 58.8456 | 1.7000 | 324.0000 |
| 10 | 8 | 3925.7672 | 0.0115 | 0.9968 | 31.2452 | 0.8500 | 59.1544 | 1.7000 | 324.0000 |
| 11 | 9 | 3377.4511 | 0.0115 | 1.0069 | 5.8214 | 0.8500 | 58.8456 | 1.7000 | 324.0000 |
| 12 | 10 | 3328.8505 | 0.0115 | 1.0069 | 5.8214 | 0.8500 | 59.1544 | 1.7000 | 324.0000 |
| 13 | 11 | 3621.1927 | 0.1135 | 1.0069 | 17.4963 | 0.8500 | 58.8456 | 1.7000 | 324.0000 |
| 14 | 12 | 3568.4368 | 0.1135 | 1.0069 | 17.4963 | 0.8500 | 59.1544 | 1.7000 | 324.0000 |
| 15 | 13 | 3831.1536 | 0.1135 | 1.0069 | 27.2510 | 0.8500 | 58.8456 | 1.7000 | 324.0000 |
| 16 | 14 | 3774.7952 | 0.1135 | 1.0069 | 27.2510 | 0.8500 | 59.1544 | 1.7000 | 324.0000 |
| 17 | 15 | 3918.7817 | 0.0115 | 1.0069 | 31.2452 | 0.8500 | 58.8456 | 1.7000 | 324.0000 |
| 18 | 16 | 3860.9138 | 0.0115 | 1.0069 | 31.2452 | 0.8500 | 59.1544 | 1.7000 | 324.0000 |

FIG. 12C

EFFICIENT DESIGN PROCESS FOR THE ALLOCATION OF VARIABILITY TO NON-NORMALLY DISTRIBUTED COMPONENTS OF COMPLEX SYSTEMS AND FOR THE ESTIMATION OF THE SYSTEM RESPONSE PROBABILITY DENSITY

FIELD OF THE INVENTION

The present invention relates to statistical design methods and, more particularly, to a point estimation method and system that produces estimates of a system's probability density function in a minimum number of function evaluations or simulation runs.

BACKGROUND OF THE INVENTION

Point Estimation Methods (PEM) were introduced in the field of Civil Engineering in the early 1980s by Emilio Roseblueth. A PEM is a method for estimating the probability density of a response variable with minimal sampling of a transfer equation or simulation. Although there have been numerous publications and improvements of the original methodology since the introduction of PEMs, most of the focus has remained within the field of Civil Engineering. In mid 2004, Liping Wang et. al. presented an aerospace application that went significantly beyond the original methods, and introduced what has since been known as a second generation PEM.

A second generation PEM may utilize the same function or simulation as a first generation PEM but builds a customized multi-level designed experiment the evaluation of which leads directly to an estimated probability function for the system response.

SUMMARY OF THE INVENTION

A system and method in accordance with the present invention provides a second generation PEM design process whose final stage produces an accurate estimation of a probability density of a response variable. The methodology may be implemented in computer executable code using any one of a number of different programming languages and, when executed by a processor, becomes an effective tool for determining a system's probability density function. The process is particularly efficient and utilizes a minimum number of function evaluations or simulator runs to produce the estimation. The methodology described herein is a second generation implementation of the original PEM methodology and can be used in conjunction with a top-down flow down allocation process, which is described in co-pending application Ser. No. 11/530,491 filed on Sep. 11, 2006, the contents of which is hereby incorporated by reference in its entirety.

Given a simulation, hardware prototype or closed form equation that computes the value of a response variable based on values of the input variables, a second generation PEM can design an experiment and evaluate the results to predict a probability density function of the response with as few data collection events or function evaluations as possible. Further, the second generation PEM methodology allows the construction of designed experiments with different numbers of levels for each design variable. In addition, the methodology can assign both the number of levels and the value of each level automatically.

The second generation PEM methodology can assign the number of values (levels) to use for each input variable based on that variables contribution to the response variability. In doing so, a more accurate estimation of the system response can be produced. In addition, the actual variable values to associate with each level are also assigned in the process. The methodology implemented here utilizes the Johnson family of probability densities, which fits data to one of four distribution families based on matching the first four standardized, central moments of the data. This is an innovation which makes it possible to universally pre-assign values to variable levels based only on the number of levels and the probability density function of an input variable.

A second generation PEM methodology for designing and evaluating an experiment can produce a direct estimate of the probability density function (PDF) of a response. Compared to Monte Carlo methods, accurate PDF estimates are usually produced in a small fraction of the runs required by Monte Carlo trials. Thus, the second generation PEM methodology described herein can be used as an alternative to the Monte Carlo methods.

The second generation PEM methodology will look in many ways like a Designed Experiment (DOE) but differs fundamentally in that both the number of values of each variable (# levels), and the actual values associated with these variable levels are considered part of the design process and are generated by the second generation PEM tool itself. Unlike a traditional designed experiment, however, the second generation PEM process skips the regression phase of the modeling that is normally done in a designed experiment. A Weighted least squares regression could be done on the data produced by the second generation PEM methodology since the weights are generated automatically by the process employed) but normally this is not done. Instead a method similar to that originally introduced in the 1981 Rosenblueth paper is employed and the PDF of the response or output variable is determined directly from the experimental data. In most cases this obviates the need for any regression modeling.

The second generation PEM methodology described herein allows a user to describe both normal and non-normally distributed design variables. The methodology is thus not limited to cases where the design variables and the system response are treated as normally distributed. The second generation PEM methodology can produce a custom representation of the system response probability density. This system response PDF can be used to explore appropriate specification limits for the response, to predict the fraction of defectives for specified performance limits, or to estimate confidence intervals for any performance region of interest. This methodology also includes a provision for allocating variability to the components of a complex system and this is done in such a way that specified system response performance is assured.

Prior art PEM methods do not address the issue of allocating variability to the components of a design, nor do they utilize the approach of building probability densities from data. The second generation PEM methodology described herein uses the mean, variance, skewness and kurtosis of a data set to uniquely fit each design variable to a probability density function. These four parameters (mean, variance, skewness and kurtosis) represent the first four standard central moments of a random variable x. Using the N. L. Johnson method of fitting data to probability density functions it only takes knowledge of the first four moments of the data to generate estimates of the PDF of a variable. This second generation PEM methodology begins with user specification of the moments of each design variable and uses this information together with a designated transfer function or simulation to create and evaluate an experimental design). The moments (and hence the PDFs) of the system responses are predicted based on an analysis of data that is collected when the designed experiments are executed. The efficiency of the design results from selectively sampling the input variables that drive the response, according to their respective contributions to the response variability, and according to the likelihood of occurrence of individual variable values.

One feature of the methodology is that all the functionality is available to users that do not have a system transfer function but who may have a system simulation or prototype hardware. In these latter cases provisions can be included for estimating the first and second derivatives of the response with respect to each design variable and these can be used directly in lieu of a system transfer function or simulation.

According to one aspect of the invention, a system and method for estimating the probability density of a response variable includes: building a customized designed experiment such that each input variable x for the designed experiment is assigned a number of variable values n based on the respective input variable's contribution p to overall response variability; and evaluating the designed experiment to predict a probability density function of the response variable.

To the accomplishment of the foregoing and the related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although the various features are described and are illustrated in respective drawings/embodiments, it will be appreciated that features of a given drawing or embodiment may be used in one or more other drawings or embodiments of the invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Additionally, in the drawings, like reference numerals designate corresponding parts throughout the several views.

FIG. 1 is table showing exemplary solutions for $z_n$, $p_n$ for values of n from 1 to 6, respectively, which represent the z values and weights to use for each value of n.

FIG. 2 shows an exemplary list of candidate designs for a system with six input variables (V1-V6) in accordance with the invention, wherein each row of the table represents a different candidate design, and the last column of the table indicates the quality of the design relative to the largest design in the list.

FIG. 3 is a table showing data for an exemplary experiment in accordance with the invention.

FIGS. 9A-9B are exemplary tables that show differences between actual component tolerances when pressure and temperature correlations are accounted for and when they are treated as being independent in accordance with the invention.

FIGS. 10A-10C are screen shots of partial results for an exemplary experiment in accordance with the invention.

FIGS. 12A-12D are exemplary screen shots of the second generation PEM design process in accordance with the invention.

DESCRIPTION OF THE INVENTION

Figure 4:
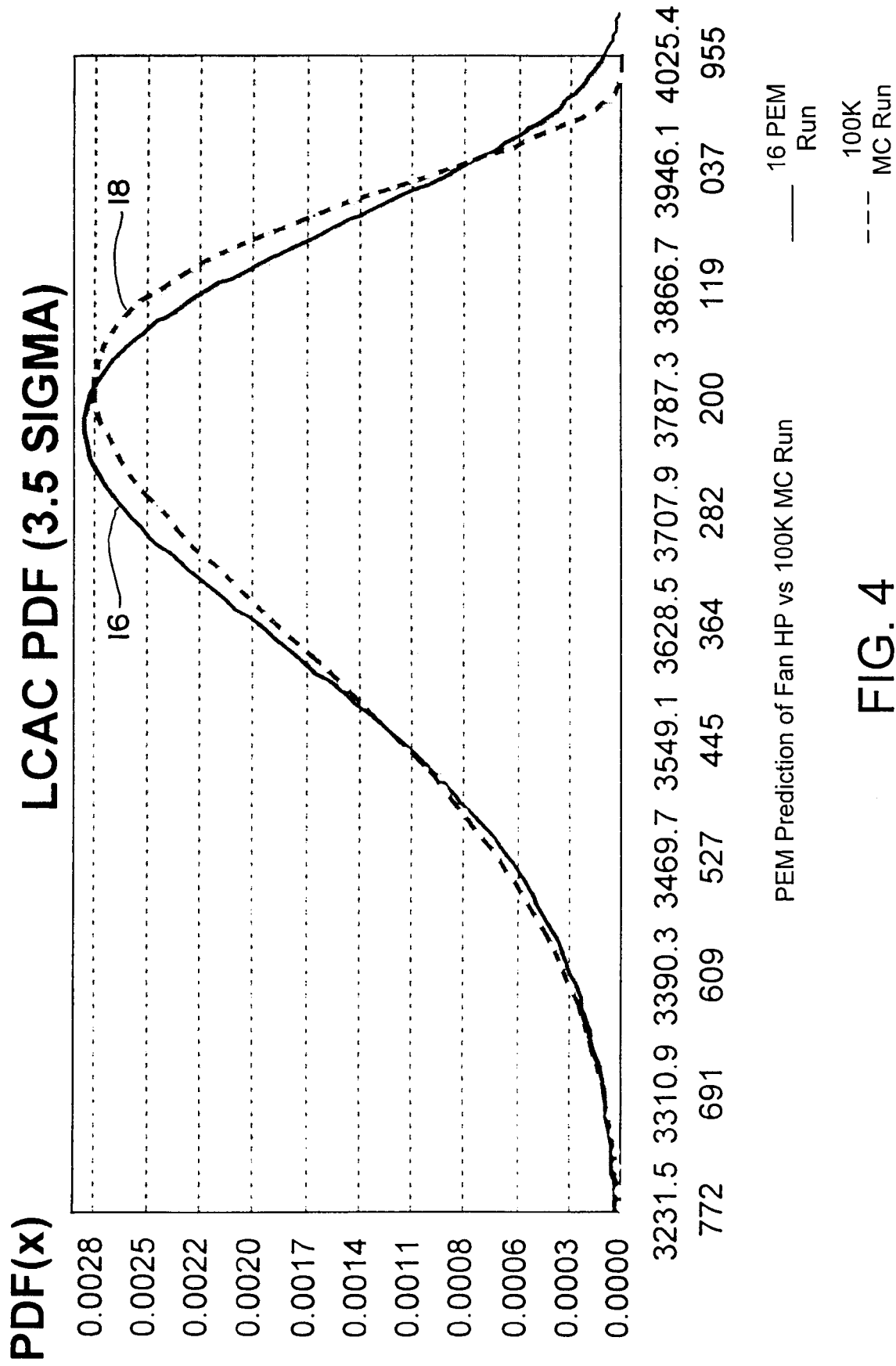
FIG. 4 shows an exemplary 100K run Monte Carlo estimation curve of the PDF overlaid with an exemplary PDF computed using the second generation PEM methodology in accordance with the invention.

The following is a detailed description of the present invention with reference to the attached drawings, wherein like reference numerals will refer to like elements throughout.

Since the invention has been developed using a spread sheet program (e.g., Microsoft Excel or the like), it will be chiefly described in this context. It will be appreciated, however, that the invention may be implemented in any number of different programming languages and/or platforms.

The second generation PEM implementation can use the method of N. L. Johnson for fitting probability density functions to data. In this method the mean, variance, skewness and kurtosis of a data set are sufficient to uniquely fit any set of data to a probability density function. These four parameters (mean, variance, skewness and kurtosis) represent the first four moments of a random variable x. Knowledge of the first four standard central moments of the data can be used to generate estimates of the PDF of a variable of interest. Therefore, it is desirable to efficiently estimate these four moments, focusing first on the input variables (to create an experimental design) and then on the outputs (system responses) to predict the probability density functions from the analysis of data that is collected when the designed experiments are executed.

Equation 1 represents a method of Gaussian quadratures as it is applied to the estimation of the $j^{th}$ moment of a random variable x. We shall be interested in this equation for values of j from 0 to $2n-1$ where n is the number of levels (or values)

used to represent the variable in question. This represents a system of 2n equations in 1n unknowns (n p values and n x values).

$$\int_{-\infty}^{\infty} x^j f(x) dx = \sum_{k=1}^{n} p_k * x_k^j \text{ for } j = 0, 1, \ldots 2*n-1 \qquad \text{Equation 1}$$

If a random variable x is represented by a representative sample of size n from its domain of definition, the solution of the above set of equations is used to estimate which n values of the variable to choose, and to assign weights (the p values) to associate with each variable value. This set of paired p and x values then has the property of being able to reproduce the first 2n−1 moments of the random variable x using the above equation.

Thus, $\{x_k\}$ and $\{p_k\}$ values are selected for each input variable by solving the above set of 2n equations, where n is the number of variable values (levels) that will be used to represent the variable in the experiment that is designed. The solution of this set of equations is greatly simplified in the second generation PEM methodology described herein, because Johnson fits are used for each input variable. The Johnson method of pdf fitting maps each design variable into a standard normally distributed variable. This means that the above set of equations can be solved just once for each value of n by treating x as a standard normal variable.

Then, having determined the number of levels to use for the representation of each design variable, the solutions to the above equation will determine weights (p-values) to assign to each variable value, and the actual n values to use for each variable are determined from the Johnson transformation equations by mapping the normally distributed data values back into the variables domain of definition. Universal solutions of this nature have been found for n=1 to 6 and are presented in more detail below.

Attention now is directed to a method that the second generation PEM methodology can use for the assignment of the number of levels for each design variable. In the process described in co-pending application Ser. No. 11/530,491, it is shown that the variability of a system response can be computed from Equation 2.

$$\sigma_R^2 = \sum_i \left\{ S_i^2 \sigma_i^2 + S_i T_i \sigma_i^3 Sk_i + \left[\frac{T_i \sigma_i^2}{2}\right]^2 (K_i - 1) \right\} \qquad \text{Equation 2}$$

$S_i$, and $T_i$, in this equation represent the first and second derivatives of the response with respect to the $i^{th}$ component or design variable and can be determined as described in co-pending application Ser. No. 11/530,491. $Sk_i$ and $K_i$ represent the Skewness and Kurtosis of variable number i and, for example, are from the third and fourth standard central moments of each design variable. They also can be estimated based upon the type of probability density the variable is believed to represent. Equation 2 is complete to second order except that it ignores possible covariance terms between the design variables (input variables). However it is well known that such covariances can be removed through a suitable transformation of coordinates, so there is no loss of generality in Equation 2. The $i^{th}$ term of the above sum represents the contribution of the $i^{th}$ variable to the total system variability. With the considerations which follow, this equation can be used as a basis for determining the number of levels (variable values) and weights (p values) to use for each variable in the design.

If n values are used to represent a variable, an area under the tails of that variable's PDF beyond the extreme values that are sampled is ignored. This area depends on the extreme values assigned to that variable (a function of n only since, in the Johnson representation, all variables can be transformed to normal variables) and for any variable the omitted area will always get smaller with increasing values for n. The product of the above tail area with the variable's contribution to the response variance is taken as an estimate of the error in the system response variability associated with the choice of n levels for the variable in question. This is a conservative approach since it allows that all the neglected tail area (the 'error') transfers directly into error in estimating the system response probabilities.

To implement this process various values of the total system error, epsilon, are tried dynamically and for each value of epsilon the number of levels for each variable are iterated starting from 1 until:

a. the contribution from each variable to error in the system response is less than the trial value of epsilon; and b. the sum of all contributions to the estimate of system response error is less than twice epsilon (or any other multiple, but 2 is the default in the second generation PEM process as implemented).

This process results in a Table of Candidate Designs where, for each, the number of variable values for each variable in the design has been determined as noted above. In the present implementation of second generation PEM methodology, these 'candidate designs' are shown, indexed by the ratio of 'error' values that resulted when they were used. For instance, if the Relative Quality for a candidate design is 94% the implication is that the best (topmost) design on the design sheet would produce only 94% of the 'error' of the design in question. The best designs usually require more total experiments and users can use this relative quality index to decide if increasing the number of levels for any variable will result in a significant reduction in the maximum system 'error'. Note that 'error' as used in this context does not necessarily correlate with actual error in the design. It is based on the conservative assumption that all the neglected tail area of each design variable maps directly and additively into neglected area under the system response PDF in proportion to that variables known percent contribution to the system response variance. Each instance of an application of the second generation PEM methodology can produce a table of such candidate designs.

An example of the type of problem that the second generation PEM methodology can address is shown in Equation 3, wherein a response y is specified as a function of n design variables x1, x2 . . . xn.

y=f(x1,x2,x3 . . . xn)                                   Equation 3

Given such a problem, the question arises of how many times and at what places in the $\{x\}$ design space must the function be evaluated in order to estimate the probability density function for the response variable y. Traditionally, and assuming the statistical properties of variables $\{x\}$ are known, one would run a Monte Carlo experiment and generate the PDF of variable y by fitting the data collected in the Monte Carlo runs to a probability density function. In fact, the function f need not be known explicitly as indicated in Equation 3, but can be known implicitly from a simulation. The second generation PEM methodology has been designed to accept data from a simulation, but some pre-processing may be required as discussed below.

Instead of presenting the methodology in the context it was originally conceived, the PDF fitting can be done using the Johnson system that was introduced herein. Thus, the question can be rephrased as how many times and in what places should a function be evaluated (or a simulation run) in order to accurately determine the first four moments of the response variable, y. Given the moments of the response, the Johnson PDF fitting methodology can be used to estimate the PDF of the response. For this reason, the second generation PEM tool can include the Johnson PDF fitting methodology in its entirety.

Although both aspects of the above question will be addressed, for the moment it is assumed that the number of levels (data values) to be used for each input variable have already been determined. That part of the question will be addressed subsequently and for now, focus will be on the issue of determining what values will need to be sampled for each input variable.

The method of Gaussian quadratures is a method for numerical integration which approximates an integral by a sum of terms, each term being the product of the integrand evaluated at a fixed point and a weight (p-value) corresponding to that point. If k terms are used in the sum, then Equation 4 is obtained, where e(k) represents an error term. In practice, orthogonal polynomials are used (usually Hermite or Laguerre polynomials) and for any given g(x) values of the pairs $\{x_j, w_j\}$ for j=1, 2 . . . k can be computed, as well as estimates of the error term.

$$\int_{x1}^{x2} g(x)dx = \sum_{j=1}^{k} w_j g(x_j) + e(k) \quad \text{Equation 4}$$

It is known that Johnson distributions are obtained by transformation of real variable values to normally distributed variable values. So, the problem of determining the moments can be simplified by assuming that the problem has been transformed into the normal space representation of the variable. In this case the representation of the Gaussian quadratures for the computation of the $n^{th}$ moment would be given in Equations 5 and 6, where f(x) is the standard normal distribution (mean=0, standard deviation=1).

$$\int_{-\infty}^{\infty} x^n f(x)dx = \sum_{j=1}^{k} x_j^n f(x_j) w_j + e(k) \quad \text{Equation 5}$$

$$f(x) = \frac{1}{\sqrt{2*\pi}} \text{Exp}\left(-\frac{x^2}{2}\right) \quad \text{Equation 6}$$

Fortunately, for the normal distribution, these moment integrals can be evaluated in closed form for any integral value of n, so rather than use an approximate representation in the method of quadratures, solutions can be sought in closed form. The moment integrals for the normal distribution are given by Equation 7 (for even values of n), where ! represents a factorial and $\mu$ and $\sigma$ represent the mean and standard deviation of the normal distribution (0 and 1 respectively in the present example), and, for odd values of n are all zero.

$$<(x-\mu)^n> = \frac{n!\sigma^n}{2^{\frac{n}{2}}\left(\frac{n}{2}\right)!} \quad \text{Equation 7}$$

Noting that there are 2k unknown parameters in Equation 4, a system of 2k equations in 2k unknowns can be obtained by evaluating Equation 4 for n=0 to 2k−1. When Equation 6 is substituted into Equation 4 and the right hand side of Equation 4 is written as shown in Equation 8 where, with no loss of generality, the w'(x) have absorbed the density function f(x) in Equation 4. When this is done, the solutions for xk, w'k have been found for values of k from 1 to 6. These solutions are shown in the table of FIG. 1, which presents the weights (p values) and z values.

This table can be used for any variable that has been fit to a probability density using the N. L. Johnson method of fitting. The variable z is used instead of x to indicate that the variables are viewed in their standard normal representation. In practice, when the experiments are designed these z values can be transformed into the real data space for each variable.

$$\sum_{j=1}^{k} x_j^n w_j'(x_j) \quad \text{Equation 8}$$

Instead of sampling throughout the range of values of the variable as in a Monte Carlo simulation, the second generation PEM methodology samples at only a few selected points, weighted as shown because these points with the assigned weights are known to capture the most significant features of the variables variation and, in particular, are sufficient to reproduce the needed moments of the distribution. If more than six values (levels) are needed, approximate solutions of Equation 4 can be sought.

Now the number of variable values (levels) to use for each input variable can be determined. If more levels are assigned to variables that contribute most to the variance and/or to the mean value of the response, then the converse is that fewer levels or values would be used for variables that had less of an impact on the response variability or its mean. This comes from examination of a linear model of the system response in the neighborhood of a selected design point for the case where the mean and standard deviation of the response are given by Equations 9 and 10, where $S_i$ and $T_i$ represent the first and second partial derivatives of the response with respect to variable i, and $\sigma_i$ represents the standard deviation of variable i. In this mixed order representation of the problem only the first partial derivatives contribute to the response variance, but only the second partials impact the response mean value. Since both effects are significant, they may be treated separately in this representation.

$$\mu_R = (\text{Response at factor means}) + \frac{1}{2}\sum_{i=1}^{n} T_i \cdot \sigma^2 \quad \text{Equation 9}$$

$$\sigma_R^2 = \sum_i \{S_i^2 \sigma_i^2\} \quad \text{Equation 10}$$

As discussed above, to second order, system response variability can be represented by Equation 2. As a note, Equation 2 is derived by computing the variance of a second order model of the system response treating all variables as uncorrelated. From Equation 2, it is seen that the terms which contribute to the shift in response mean in Equations 9 and 10 also contribute directly to the variation of the response when the higher order model is used. Thus, it should not be necessary to treat these effects separately and the model in Equation 2 may be used.

If the z values in the table of FIG. 1 are examined, the maximum z value increases with n (the number of data points used to represent the variable). Thus for n=2, z values out to plus or minus 1 are sampled, but for n=3 the maximum z values are at plus and minus $\sqrt{3}$, and at n=4 they move out to 2.33, etc. Thus, for any variable, if n levels of that variable are used to represent it, there is a corresponding maximum z value. The area under a standard normal curve that falls outside this maximum z value can be used as a measure of the maximum error incurred in a decision to represent the variable by only n values. If this maximum error is multiplied by the fractional contribution of that variable to the system response variance, an estimate of the error in the estimation of system variability attributable to the choice of n levels for the variable can be obtained. This approach can be implemented in the second generation PEM methodology as part of an iterative algorithm.

A target value for the total maximum error in the estimation of system response variability can be set and a limit placed on the maximum contribution that may be contributed by any one variable to that error. Then an iterative search can be done. Beginning with the assumption of a single level for each input variable, the total error contribution can be computed. If the error contribution exceeds the targeted maximum, the number of levels for the variable that is contributing the most to the estimated error in the system response variability is increased by 1, and the calculation is repeated. If at any time the error contributed by a single variable exceeds the maximum allowable for any variable, the total response error budget is reduced by some fixed fraction and the problem starts again from the beginning. Otherwise the steps are repeated, each time increasing by 1 the number of levels for the variable currently contributing the most error in the estimation of total system response variance. This process is repeated until the estimated error in the system response variation is less than the targeted value or until all variables have been assigned the maximum number of levels (6 in the present implementation).

By running such an algorithm, and using different values for the maximum total allowable error in the estimate of system response variance, a table can be produced as shown in the table of FIG. 2. FIG. 2 shows a list of candidate designs for a system with six input variables (V1-V6). Each row of the table represents a possible design and indicates beneath the variable name, the number of levels (values) that would be sampled for each variable. The product of all of these values on a given row would represent the total number of experiments in a full factorial representation of the design represented by that row. Since an objective of the second generation PEM methodology is to get as much information as possible about the system response in the least possible number of runs, the implementation of the methodology defaults to the next to bottom row of the candidate design table (the row 10 in FIG. 1, in this case consisting of 16 runs). With no user intervention, this design would be automatically selected and executed in the methodology. A user, however, may override this default selection and use any of the full factorial designs or any design with 1 to 6 levels selected for each design variable.

Once the number of levels for each variable has been assigned, the levels (z values) and the weights (p-values) associated with those levels would be read from the table of FIG. 1. The column labeled as 'Rel Qual' indicates the relative quality of the design and is computed as the ratio of the best (top row) design's maximum contribution to error in system variation estimation to the particular designs' maximum contribution to error in the estimation of system variation.

A table as shown in FIG. 2 can be produced for every application of the second generation PEM methodology. Once a design is selected, a full factorial designed experiment can be constructed from the z values so determined, but in the actual experiment the z values can be replaced by the corresponding variable values using the Johnson transformation appropriate for each variable. This is analogous to the DOE transformation from 'coded' to 'real' variable values. The weight assigned to each experiment in the design is simply the product of the p-values associated with each of the z-values.

Generally, it is an objective to predict system response behavior in a minimum number of function evaluations or simulation runs. Thus, a default condition in the second generation PEM methodology can be to select the experiment that would produce the minimum simulation runs or minimum number of function evaluations. An actual experiment designed in this manner is shown in the table of FIG. 3. The data shown in FIG. 3 is for a ducted fan example presented below. The default experiment is the second from the bottom in the table of FIG. 2 (row 10), and represents a 16 run experiment.

The weights 12 shown in the table of FIG. 3 are the products of the p values associated with the design levels for each variable in the design. In this design table the column of Response Values has already been filled in. This will be so in any instance in which the user has entered an equation for the response on the allocation process sheet that is part of the second generation PEM implementation. In instances in which a response equation is not known, the Response Value column 14 of the Design sheet 20 will be empty. At this point the user can set the design variables to the values indicated in the table and measure the system response value (or obtain it from a computer simulation) and this would be repeated for each experiment in the design (16 in this example).

One could proceed to a weighted least squares regression of response data as might be done in a conventional designed experiment, but in a PEM process this stage is normally skipped in favor of a more direct approach. In the second generation PEM methodology, the first four moments of the response can be computed from the Response Values, $R_j$, using the experiment weight values $w_j$ as indicated in Equation 11. The four standard central moments then can be computed and can be used in the Johnson Fitting methodology to directly estimate a PDF for the system response R. Once the response values are filled in, the process continues by estimating the four moments of the response using the response values and weights indicated in the above table.

$$E(R^n) = \sum_{j=1}^{\#Runs} w_j * R_j^n \qquad \text{Equation 11}$$

Suppose for example that an analysis is performed on design requirements for a ducted lift fan that will be used to provide lift for an LCAC (landing craft, air-cushioned). A starting point can be obtained from a computer simulation that predicts HP (horsepower) as a function of the design variable values, or, in this example, a closed form estimate of the HP from a ducted lift fan can be used. Equation 12 is an exemplary model for predicting horsepower of the LCAC.

$$HP = n*m\left[\left(\frac{m}{\rho_2 A_2 \sqrt{2}}\right)^2 - \left(\frac{m}{\rho_1 A_1 \sqrt{2}}\right)^2 + C_p T\left\{\left(\frac{p_2}{p_1}\right)^{\left(\frac{k-1}{k}\right)} - 1\right\}\right] \quad \text{Equation 12}$$

The number of times and at what places in the design space the function is evaluated to estimate the probability density function for the response variable can be determined using Equation 3 (or the results of a simulation) in conjunction with the allocation process described in co-pending application Ser. No. 11/530,491. This will yield a percent contribution of the response variance that is contributed by each design variable. Additionally, the first four moments of each design variable can be computed from data if it is available, or the allocation process can be used to allocate standard deviations to each component of the design so that specified target values are produced for the response (a SIGMA score, PNC or standard deviation for the response HP). Then, values for the skewness and kurtosis of each variable can be assumed. Typically, a uniform or normal distribution is assumed for each parameter in the allocation process, but in the second generation PEM methodology each variable can be modeled with any legal values for these parameters. The moments of most standard types of probability densities are known as a function of the distribution parameters, so practically any input variable type is a possible choice. As already noted, the moments would be computed directly from the data when it exists.

The PDF computed in the second generation PEM methodology in this manner is shown in FIG. 4 by curve 16 overlaid with a 100K run Monte Carlo estimation curve 18 of the PDF. Allocations for the Fan Efficiency, Fan Diameter, Fan Ration and Mass Flow Rate were selected so as to produce a 3.5 SIGMA score for the Fan HP.

Figure 5:
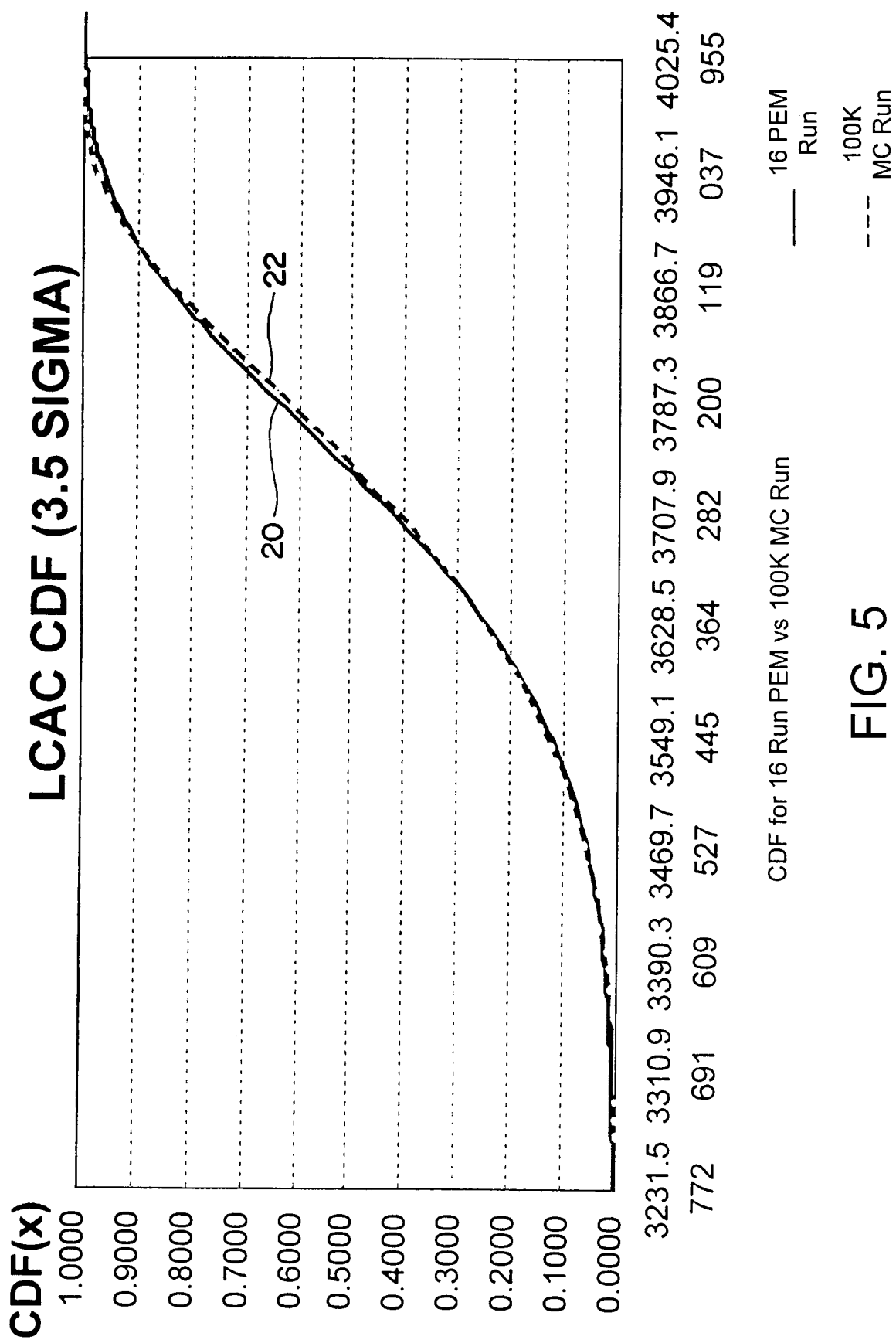
FIG. 5 shows an exemplary CDF for a 100K Monte Carlo run overlaid with a 16 run second generation PEM run in accordance with the invention.

A comparison of the cumulative probabilities for these two cases is shown in FIG. 5 wherein the CDF as computed by the second generation PEM methodology is indicated at 20, and a 100000 run MC data predictions is indicated at 22.

As noted previously, the PEM predictions are based on the assumption that the design (input) variables are statistically independent, and to be consistent the comparisons shown in FIGS. 4 and 5 were done with correlation between temperature and pressure turned off in the MC runs as well.

If the input variables are thought or known to be significantly correlated, the data should be pre-processed before entering it into the second generation PEM tool. If the covariances between the input variables are known, the data can be orthogonalized (and thus made independent) by a variant of the Gram-Schmidt orthogonalization procedure. Thus, if the initial data set is {X} and the covariances between members are known, an orthogonal data set {V} can be constructed from Equation 13.

$$V_j = X_j - \sum_{k=1}^{j-1} Cov(X_j, V_k)\frac{V^k}{\sigma_{V_k}^2} \quad \text{Equation 13}$$

This would be done in order for j=1 to n where n is the number of variables in the data set {X}. If any Vj during this process is identically zero, the implication is that the corresponding X value is an exact linear function of the others, so this X member would be dropped from the data set.

Figure 6:
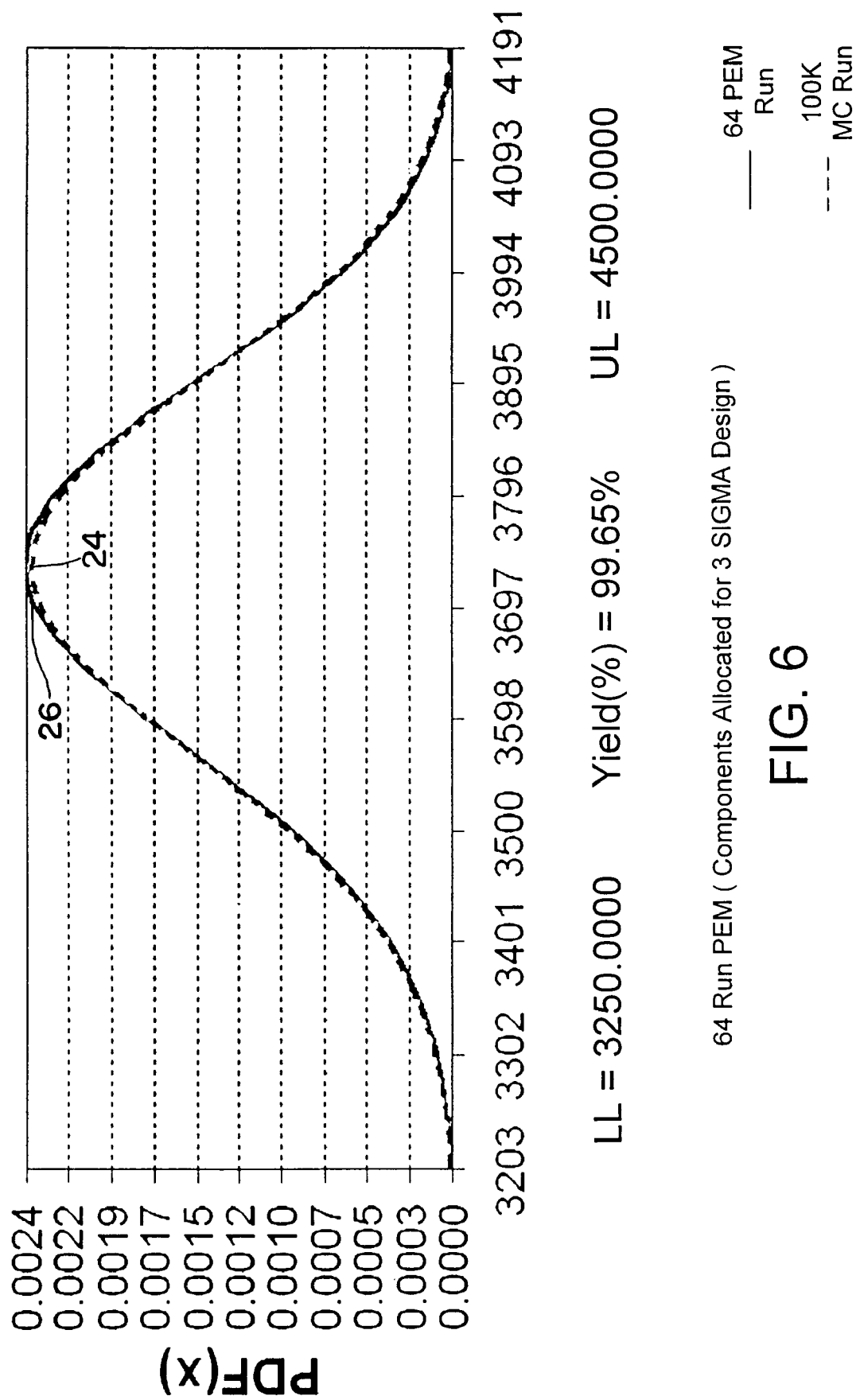
FIG. 6 shows an exemplary PDF for a 100K Monte Carlo run overlaid with a 64 run second generation PEM run in accordance with the invention.

If the covariances are not known or have not been computed, the Covariance operation in Equation 13 may be replaced with the scalar product. Then instead of normalizing using the variances of the V variables as in Equation 13, each V variable is normalized to unit length as it is constructed. This is a simple procedure to carry out on a computer and makes it possible to treat correlated variables in the second generation PEM methodology. It is noted that since the above equation set is upper triangular, the inverse transformation from the V variables back to the X variables always exists and can be constructed by back substitution. Data orthogonalization can also be implemented using any one of a number of standard matrix methods that may be available such as QR decomposition, Householder transformations or Givens Rotations. One or another of these will be available in most engineering design tools. FIG. 6 shows the result of this type of analysis and compares a 64 run second generation PEM 24 with a 100K run Monte Carlo 26 when both methods used orthogonal representations of pressure and temperature.

It is notable that 64 runs were required in this exemplary PEM analysis while only 16 were required (the defaults in each case) when the pressure and temperature were treated as if they were independent. Part of this difference is that the components in this example were toleranced to produce a 3 SIGMA design whereas in the earlier example they were toleranced to produce a 3.5 SIGMA score. Another contributor to the difference is that pressure is a bigger contributor to the response variance in the orthogonal representation and therefore is sampled more to capture its contribution to the variance. Direct comparisons of the PDF and CDF for this LCAC example with and without the correlation between pressure and temperature taken into account are shown in FIGS. 7 and 8.

Figure 7:
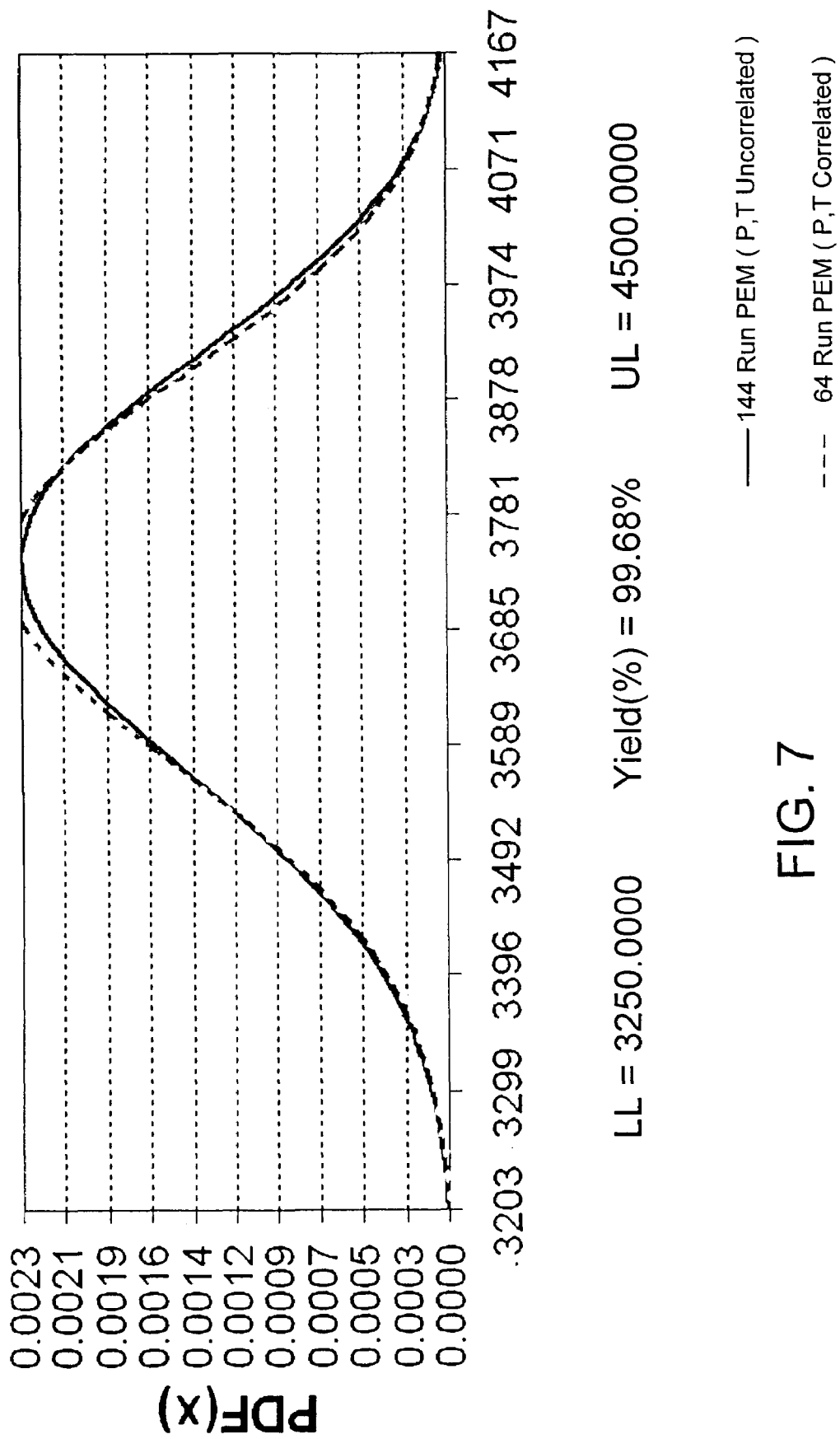
FIG. 7 shows an exemplary PDF for an uncorrelated 144 run second generation PEM overlaid with a correlated 64 run second generation PEM run in accordance with the invention.
Figure 8:
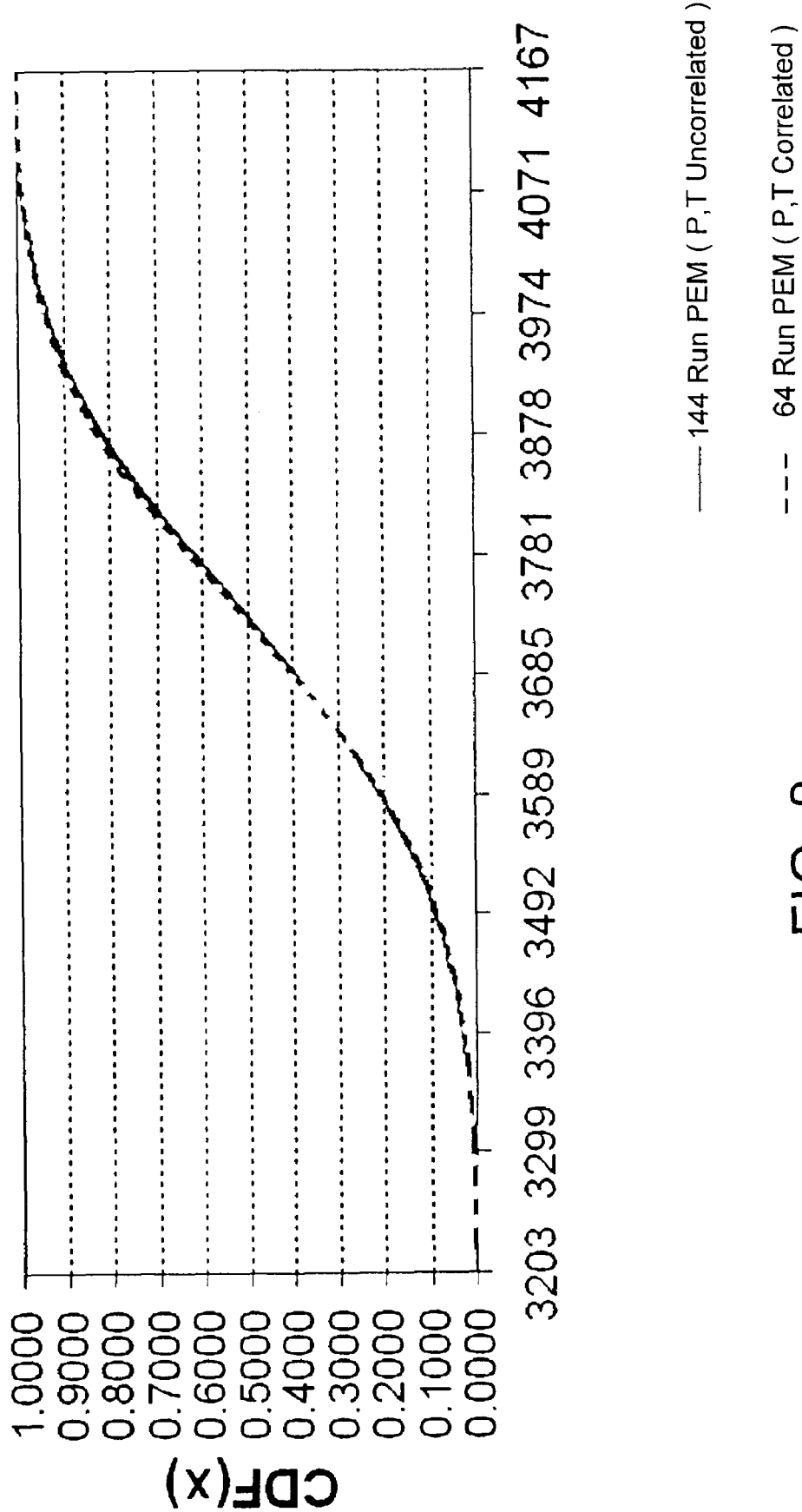
FIG. 8 shows an exemplary CDF for an uncorrelated 144 run second generation PEM overlaid with a correlated 64 run second generation PEM run in accordance with the invention.

Though it might appear from FIGS. 7 and 8 that the effect of the correlation between the pressure and temperature is small, this is somewhat misleading. In each case the design variables were toleranced to produce a 3 SIGMA design. The actual component tolerances in each case were significantly different and the components then contributed differently to the overall system response variation. These differences can be seen in tables of FIGS. 9A and 9B.

The overhead associated with the use of the second generation PEM methodology, as compared to a fixed level DOE design, is that:

The user specifies the four moments of each input variable (in order to represent it by a custom fitted Johnson PDF). This is an advantage and not a limitation since if these parameters are not known one could assume the variables to be normal (Skew=0, Kurtosis=3) or Uniform (Skewness=0, Kurtosis=1.8). Also, choices for the moment values for other known distribution functions can be found in almost any advanced statistical text. That is, when data is not available but there is a belief that the variable should be represented by a particular distribution type one can choose from Exponential, Normal, Uniform, Triangular, ChiSquare, Raleigh, Student's t, Log Normal, Logistic, Beta, Gamma, or Lambda distributions from among others.

If the standard deviations of the input variables are also not known, they can be estimated using the allocation methodology described in co-pending application Ser. No. 11/530,491. Since this may ordinarily be the case early in a design process, incorporation of the allocation methodology in the second generation PEM methodology significantly extends its functionality.

The second generation PEM methodology can use both the first and second derivatives of the response with respect to each input variable in order to estimate a variable's contribution to the response variance and to determine the number of levels to use for each variable. Since the allocation tool computes these derivatives and can be incorporated in the second generation PEM methodology, this overhead is avoided for any problem that can be directly stated in a spread sheet (e.g. Excel), or indirectly via links from other software simulation applications (e.g., MathCad or MATLAB). If the response is computed in an external simulation that cannot be linked directly to the spread sheet, the derivatives can be pre-computed using the simulation data and entered into the second generation PEM tool. The minimum overhead for this when there are n design variables is 2n+1 simulation runs and corresponds to computing a 3 point partial derivative for each variable.

One or more of the four moments of a small data set may be significantly changed by the addition of only a few additional data points. If this happens it could significantly change the response system PDF and associated probabilities computed for the system response.

Figure 10B:
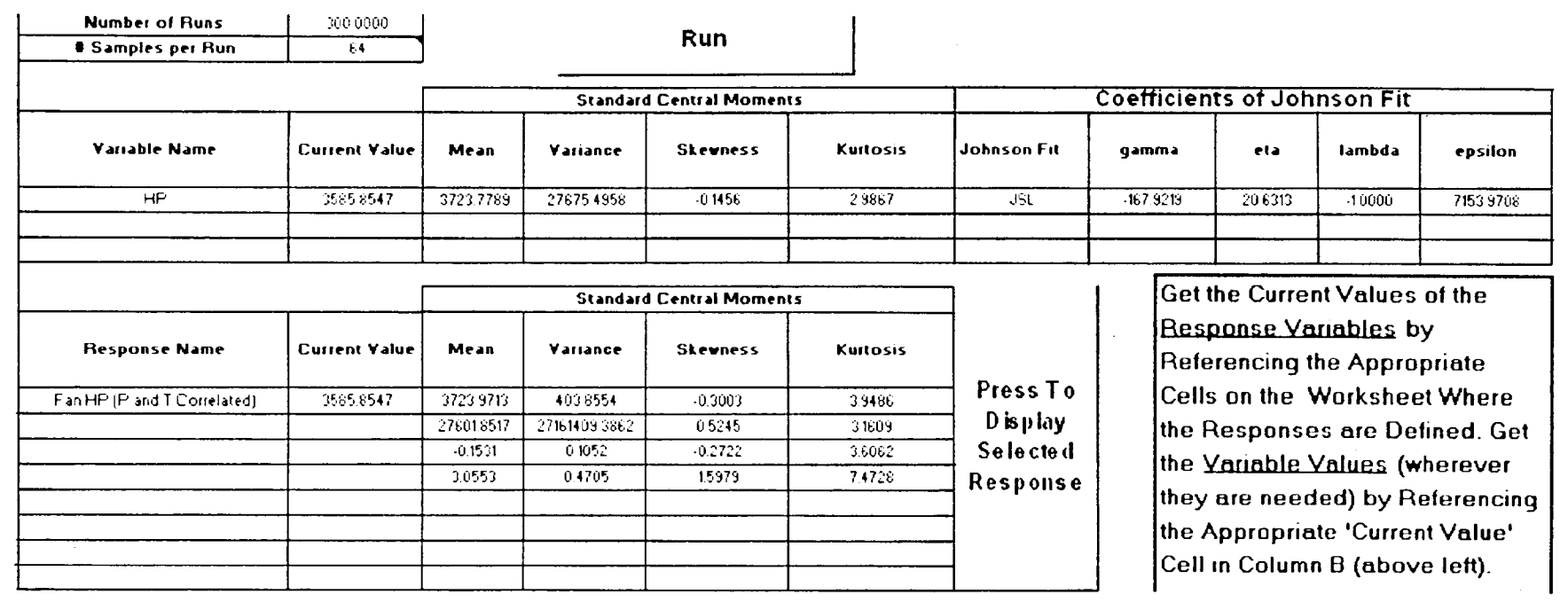
Figure 10C:
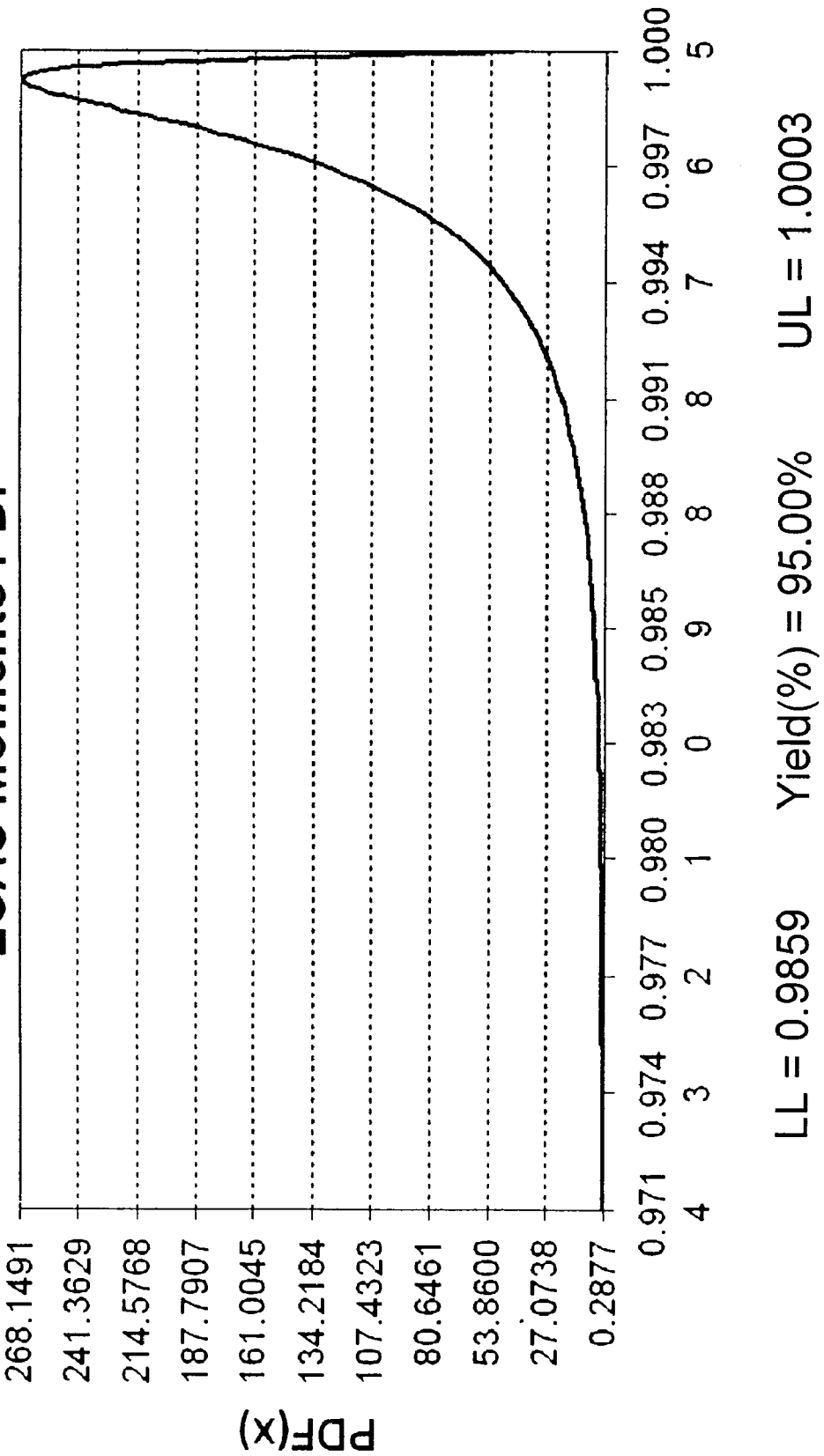

FIGS. 10A-10C show the result of this type of calculation for the lift fan equation (Equation 12). For these cases, the pressure and temperature correlations may be taken into account, and in the initial second generation PEM application the allocation feature can be used to assign standard deviations to the Fan Efficiency, Fan Diameter, Fan Ratio and Mass Flow Rate. The target value for the HP response was 3.0 SIGMA.

The initial estimate from the second generation PEM analysis is that the fan HP would be greater than 3250 HP 99.65% of the time, taking the correlations between pressure and temperature into account. FIG. 10C indicates that when variations in the four moments of the HP are taken into account (as estimated using the SMC bootstrap analysis) a 95% confidence interval for this estimate is [98.6%, 100%].

There are some subtle points to consider when running this type of analysis to determine a confidence interval for a JFit PDF prediction. Note for example that while the Johnson fitting methodology always maps a random variable into a standard normal variable, the mean of the variable does not map into the mean of the standard normal. That is why the second generation PEM setup for this problem does not have a zero as the mean value of the Johnson transformed pressure and temperature. Instead, the means of these standard normal variables were set so they would map into the actual means of the historical temperature and pressure data values. On a JFit worksheet the two functions getx(z) and getz(x) can be used establish the correct values to use. It has already been noted that while the moments of no real probability density can fall into the impossible region of the Pearson diagram (plot of Kurtosis vs Skewness Squared), the estimates of the moments of small datasets do occasionally fall into that region. A similar problem can occur with the second generation PEM estimates of the moments of a response. If that happens, this method of estimating confidence intervals for second generation PEM/JFit PDF predictions may not work.

FIGS. 10A, 10B and 10C also address a unique capability of the implementation of the PEM methodology. More specifically, when the 4 moments of a data set are used to fit the data set to a pdf (as in the Johnson methodology) and the dataset is small, the addition of one or more data points to the dataset can change the moments.

The question that arises is whether these changes can have a significant impact on the computed response. To explore this, a monte carlo bootstrap (FIG. 10B) can be run in which small samples are repeatedly drawn from the pdf fitted to the HP (horsepower) for the LCAC lift fan. Based on this monte carlo bootstrap, the moments of the moments (that is for each small sample we computed the 4 moments, and with all the runs in hand we computed the moments of the moments) can be estimated. Then, the 4 moments of the HP can be used as the inputs to the PEM application (FIG. 10A). For the response, the computed probability of compliance with the specification "HP greater than or equal to 3250" can be used. The result of this analysis is shown in FIG. 10C, which indicates that even in the face of variation in the moments, there still is 95% confidence that the HP will be greater than 3250 98.6% of the time. This is a meta-level application of the PEM methodology which explores the sensitivity of the PEM predictions to the variability of the moments of the input variables. This procedure could be followed for any application of the PEM process to establish confidence intervals for the predicted responses.

In another example, a previously produced ballistic model is used for the computation of range as a function of six design variables: dive angle, airspeed, wind speed, air temperature, target altitude and release altitude. A problem to be solved with this model is to determine whether input variable tolerances could be assigned for the four design variables that would produce a 4 SIGMA result. This type of problem can be solved in the allocation process alone (described in the co-pending application Ser. No. 11/530,491), but in that approach input variables and the response variable (range) would be treated as normally distributed. Although the assumption of normality for each input variable may be acceptable, this assumption does not necessarily extend to the output response. The second generation PEM methodology, which can operate with non-normally distributed components, can be used to provide the solution.

More specifically, the allocation process described in co-pending application Ser. No. 11/530,491 can be used to generate standard deviations for each component of the design that would produce a 4 SIGMA result (a PNC around 6.3 Exp −05) for the nominal parameter values and specification limits that had been chosen. The present example assumes that each of the design variables are normally distributed, and without assuming a normal distribution for the system response. The second generation PEM design for this problem requires only 12 function evaluations.

Figure 11:
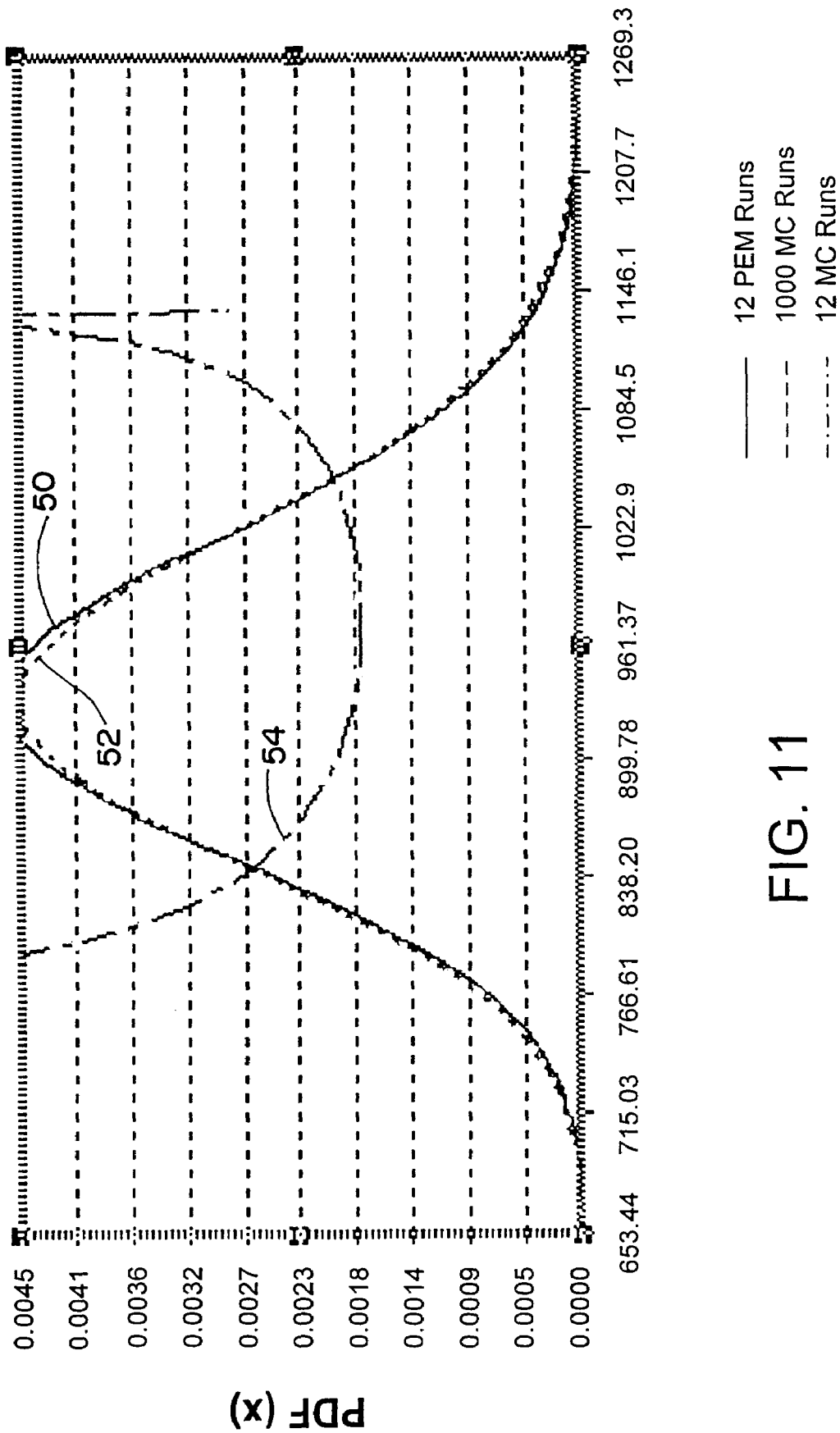
FIG. 11 shows an exemplary evaluation of a default second generation PEM design wherein a cumulative distribution function is shown overlaid with the results of 10K Monte Carlo runs

Evaluation of the default second generation PEM design that was produced for this case resulted in the cumulative distribution function 50 which is shown in FIG. 11 overlaid with the results of 10000 Monte Carlo runs 52. A random sample of twelve Monte Carlo runs 54 is also shown, to illustrate that the 12 runs of the second generation PEM design process were uniquely chosen to capture the behavior of this particular response.

For data from simulations (SIM), whether the derivatives are input to second generation PEM methodology or computed in the SIM, it is possible to build an approximate closed form quadratic equation for the response and, thus, to predict a PDF and a CDF with no additional runs of the simulation. This can be accomplished, for example, by obtaining the first and second derivatives of the response with respect to each input and using them internally to build a second order Taylor series expansion of the response. This approximate representation of the response is then used in the second generation PEM methodology to compute the response values that are produced by the second generation PEM design. Once the system responses are estimated in this manner, the PDF of the response can be estimated in the manner shown in the previous examples. The second generation PEM methodology can present such estimates to a user before any of the designed experiments are actually evaluated. In this way, only the overhead required to generate estimates of the system response derivatives is needed in order to produce estimated plots of the system response PDF and CDF. The second generation PEM methodology as described herein is applicable in contexts where:

1. Allocation is done
2. Designed Experiments (DOE) are done
3. Monte Carlo Experiments are done Together, these include almost any Engineering Design context. Exemplary screen shots of the second generation PEM design process are shown in FIGS. 12A-12D and discussed below.

Figure 12A:
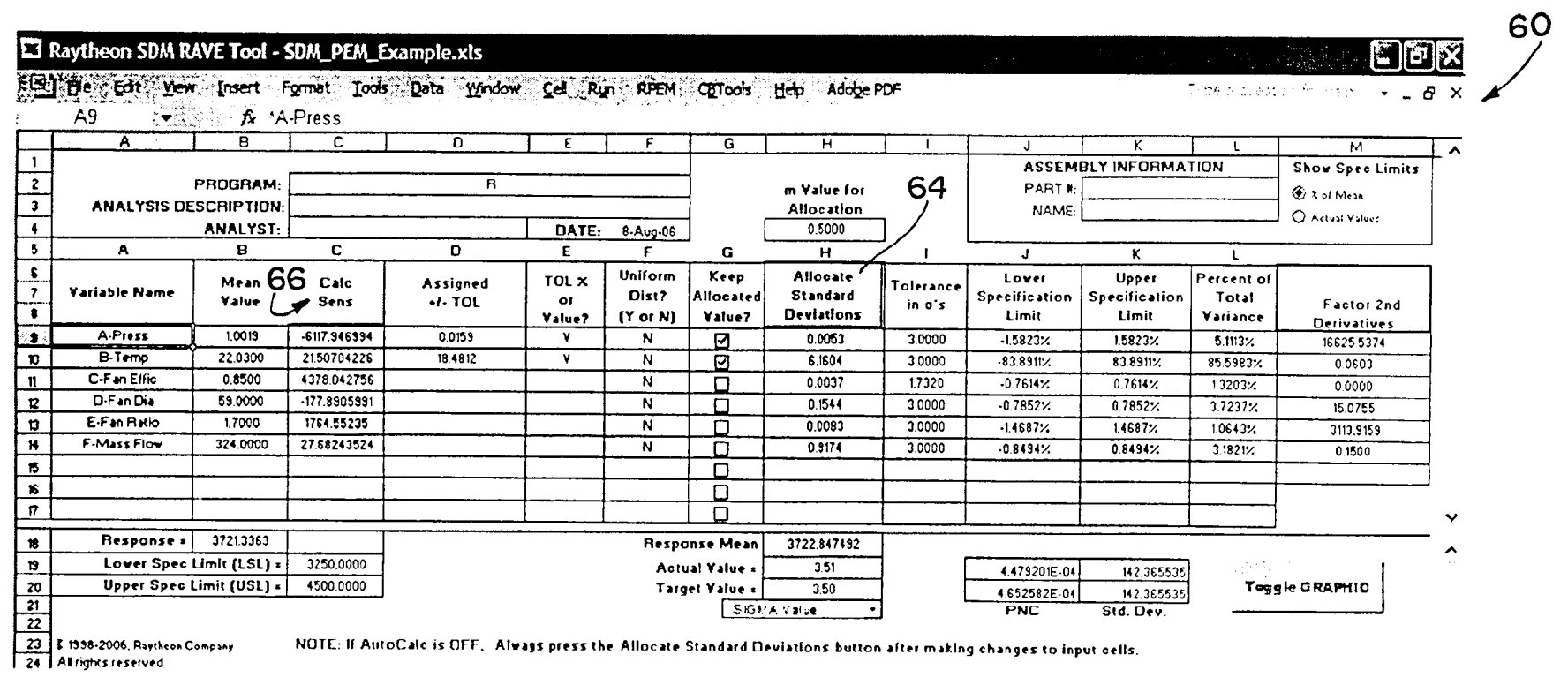
Figure 12B:
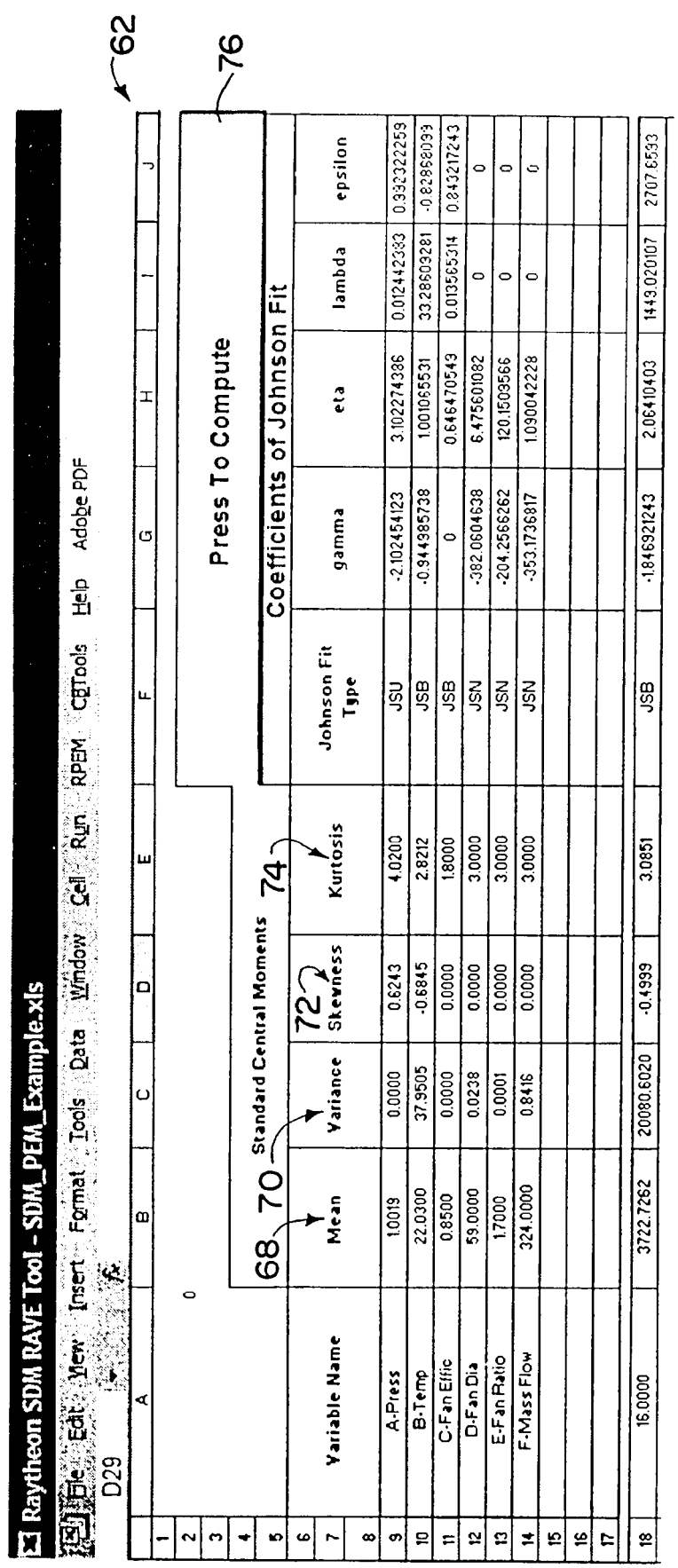

FIG. 12A illustrates an exemplary allocation sheet 60 as described in co-pending application Ser. No. 11/530,491, wherein the allocation sheet 60 is populated with data corresponding to the LCAC example. FIG. 12B illustrates an exemplary FitData sheet 62 in accordance with the invention. When a closed form equation is used and the allocation process described in co-pending application Ser. No. 11/530,491 is used to allocate variability to the components of a design, as in the present example, the FitData sheet 62 can be automatically populated with the variable names and variances after the allocation is done (e.g. after the allocation button 64 is pressed). If the component standard deviations are pre-assigned on the allocation sheet 60 and the Sensitivity button 66 on the allocation sheet 60 is pressed, the FitData sheet 62 can be automatically populated with the mean and variance of each variable.

If the data is from a simulation rather than from a closed form equation, the first and second derivatives of the response with respect to each input variable are pre-computed and entered on the allocation sheet 60 in the second generation PEM tool. At that point the tolerances can be allocated or pre-assigned just as before and when the Allocation or Sensitivity buttons 64, 66 are depressed, the mean and variance columns 68, 70 on the FitData sheet 62 can be populated automatically.

The coefficients of skewness and kurtosis for each input variable are entered in respective cells of the Skewness and Kurtosis columns 72, 74 on the FitData sheet 62 before the process continues. When historical data is available, these values can be computed directly from the data. Otherwise, they can be estimated based on the user's belief in the nature of the underlying probability density.

Once the user has populated the FitData sheet 62 with the four moments of each input variable, the compute button 76 can be pressed. The list of candidate designs is generated and from these the default design can be automatically chosen and a design sheet can be constructed. FIG. 12C illustrates an exemplary design sheet 80.

If a closed form equation has been entered on the allocation sheet 60 (or referenced by it), that equation can be used to compute the Response values for each experiment in the design, and these Response values can be entered into the Response Value column 82 of the design worksheet 80.

If closed form equation has not been entered, then the Response values for the design can be estimated by building a second order quadratic form for the response. However, to avoid confusing estimated with computed or measured values, these estimated response values are not entered on the Design sheet 80.

With the response values and weights at hand, the first four moments of the response are estimated as previously indicated. These are shown toward the bottom of the FitData worksheet 82 of FIG. 12B and are subsequently ported to the JFit worksheet 90 of FIG. 12D (only the PDF portion of the JFit worksheet is shown), which can be included as part of the second generation PEM methodology.

Figure 12D:
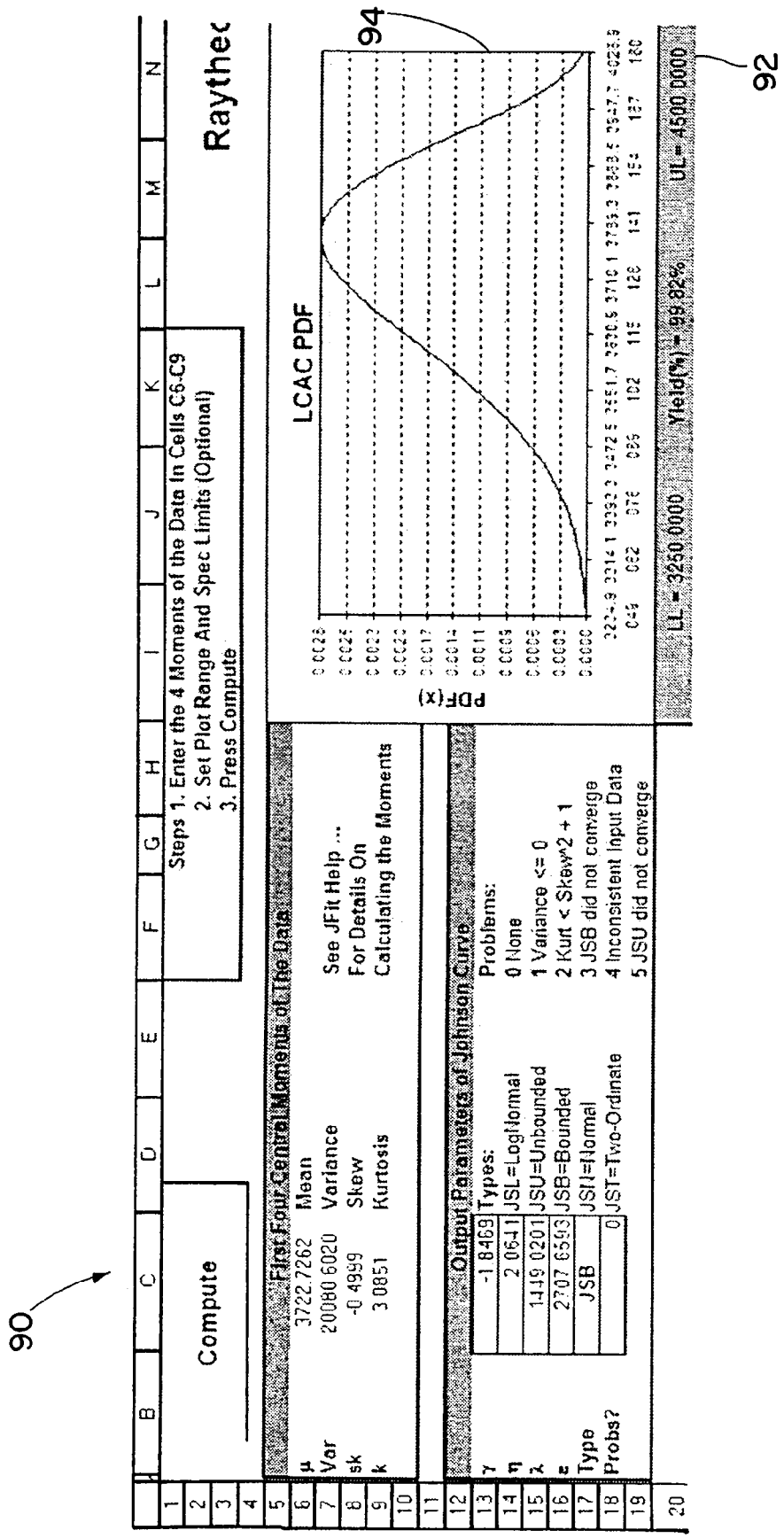

The PDF portion of the JFit PDF worksheet is shown in FIG. 12D. The CDF portion for this problem has already been presented. A computational toolbar 82 is shown just beneath a center box 94 (which shows a PDF chart) on the JFit_PDF worksheet 90. If the lower and upper limits of the response are entered into the appropriate cells on the toolbar 92, the center box 94 will show the computed probability that the system response will fall into the designated range. If a yield value is entered in the tool bar 92, the toolbar will compute and display the values for LL and UL (centered on the median) that will generate the desired yield.

A difference in the application of the second generation PEM methodology when the system response is estimated from a simulation rather than being computed directly by an equation is that the first and second derivatives of the response with respect to each design variable is pre-computed and entered on the allocation process for the particular second generation PEM application. These derivative values can be used to build a second order model of the response that will be offered to the user as an 'Estimated PDF' and 'Estimated CDF'. If the user decides to then conduct the experiment that has been designed he would run the simulation to evaluate the response for each of the experiments on the Design worksheet and enter the response values on the Design worksheet. Pressing Compute 76 on the FitData worksheet 62 will then generate the final estimates of the system response moments and produce the final JFit estimates of the system PDF and CDF.

A particular advantage offered by the second generation PEM methodology is that it reduces the number of function evaluations or simulation runs that are required to build an accurate estimate of a system response PDF or CDF. This is done by sampling more for variables that contribute significantly to the system response variation and less for those which do not. The reduction in sample size is dramatic in many cases such as illustrated in the present example. There are cases, however, where the sample size is dramatically reduced compared to a fixed level DOE design, but is still very large. This may happen if all the variables contribute about equally to the response variance and there are many variables in the design. In such cases the second generation PEM methodology can execute a pseudo Monte Carlo exercise that uses only the fixed variable values that were assigned to each input variable, but which selects these values randomly using the weights associated with each variable value. The default in the current methodology is to enable the pseudo Monte Carlo process if the computed experiment size is over 64K.

Particular advantages associated with application of the second generation PEM methodology in the design of complex systems include:

1. The ability to allocate variability to non-normally distributed components
2. The ability to build customized (usually non-normal) estimates of a system response PDF and CDF and to accurately predict the probability of compliance or non-compliance with system specifications.
3. The ability to accomplish either of the above objectives with a reduced number of function evaluations or simulation runs compared to any other method. As previously noted, the magnitude of these reductions in the number of function evaluations or simulation runs can be dramatic, and can result in considerable savings in both dollars and time.
4. The ability to estimate the impact of sample size on the estimation of system performance. This is almost always a problematic issue in industrial designs because cost and/or time limits the amount of data that can be collected for analysis. On the assumption that the experiments that were conducted were designed and conducted correctly, the second generation PEM methodology has been extended to include the capability to establish confidence intervals for the probabilities that are generated by the process. This feature is discussed in more detail below. With this feature in place, one might find, for example, that an initial estimate of a process yield might be 92%. One might then determine that a 95% confidence interval for this estimate was [84%, 97%] based on the small sample size. The only other method known to the inventor that can produce such estimates is to run a generalized bootstrap Monte Carlo procedure, but like any Monte Carlo analysis, this will take many more runs than is required by the second generation PEM methodology (which can be computed entirely from the results of the original second generation PEM analysis).

Figure 13:
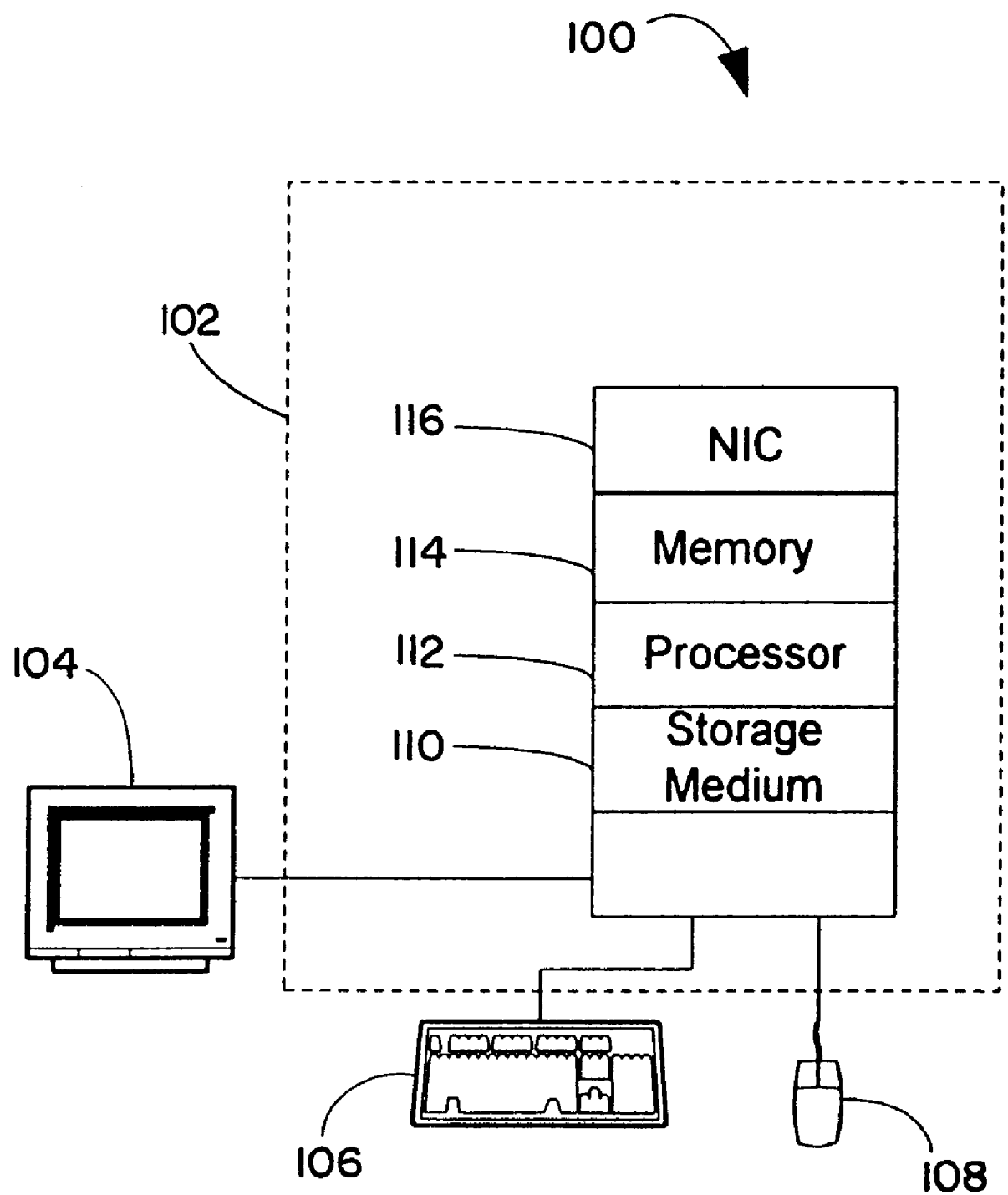
FIG. 13 is a block diagram illustrating an exemplary computer system that can be used to implement the method in accordance with the invention.

The above methodology may be implemented in a computer system that executes code, for example. FIG. 13 illustrates an exemplary computer system 100 for executing a computer program in accordance with the present invention. The computer system 100 includes a computer 102 for processing data, and a display 104, such as a CRT, LCD, or the like, for viewing system information. A keyboard 106 and pointing device 108 may be used for data entry, data display, screen navigation, etc. The keyboard 106 and pointing device 108 may be separate from the computer 102 or they may be integral to it. A computer mouse or other device that points to or otherwise identifies a location, action, etc., e.g., by a point and click method or some other method, are examples of a pointing device. Alternatively, a touch screen (not shown) may be used in place of the keyboard 106 and pointing device 108.

Included in the computer 102 is a storage medium 110 for storing information, such as application data, screen information, programs, etc. The storage medium 110 may be a hard drive, for example. A processor 112, such as an AMD Athlon 64™ processor or an Intel Pentium IV® processor, combined with a memory 114 and the storage medium 110 execute programs to perform various functions, such as data entry, numerical calculations, screen display, system setup, etc. A network interface card (NIC) 116 allows the computer 102 to communicate with devices external to the computer system 100.

A user of the system may enter data into the computer 102 via the keyboard 106 and/or pointing device 108, and the computer 102 may provide results via the display 104.

The actual code for performing the functions described herein can be easily programmed by a person having ordinary skill in the art of computer programming in any of a number of conventional programming languages based on the disclosure herein. Consequently, further detail as to the particular code itself has been omitted for sake of brevity.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A system for estimating the probability density of a response variable, comprising:
    a processor circuit having a processor and a memory; and
    logic stored in the memory and executable by the processor, the logic including
        logic configured to build a customized designed experiment such that each input variable x for the designed experiment is assigned a number of variable values n based on the respective input variable's contribution p to overall response variability, and estimate which n values of the input variable x are to be selected for use; and
        logic configured to evaluate the designed experiment to predict a probability density function of the response variable.

2. The system of claim 1, wherein the logic configured to build the customized designed experiment includes logic configured to use a method of Gaussian quadratures to estimate which n values of the input variable x are used, and to estimate the variables contribution p to associate with each input variable x.

3. The system of claim 2, further comprising logic configured to dynamically try total system error $\epsilon$, and for each value of $\epsilon$, iterate the number of variable values n for each variable x.

4. The system of claim 3, wherein the logic configured to dynamically try total system error includes logic configured to iterate the number of variable values n for each variable x until a contribution from each variable x to an error in system response variability is less than a trial value of ϵ, and a sum of all contributions to the estimate of system response variability is less than a multiple of ϵ.

5. The system according to claim 4, wherein the multiple of ϵ is two.

6. The system of claim 2, further comprising logic configured to utilize Johnson fits for each input variable x to solve the method of Gaussian quadratures.

7. The system of claim 1, wherein the logic configured to build the customized designed experiment includes logic configured to use a plurality of moments of a random variable x to fit the data set to the probability density function.

8. The system of claim 7, wherein the logic configured to use the plurality of moments includes logic configured to sample the input variable x at a few selected points to reproduce the moments.

9. The system of claim 8, wherein the few selected points are 6 or less selected points.

10. The system of claim 7, wherein the logic configured to use the plurality of moments include logic configured to use a mean, variance, skewness or kurtosis of the random variable x.

11. The system of claim 1, further comprising logic configured to use an area under a standard normal curve that falls outside a maximum z value as a measure of maximum error incurred in a decision to represent the variable x by n values, and multiply the maximum error incurred by the variable's contribution p to determine an approximate error in the estimate of system variability attributable to the choice of the number of variable values n for the variable x.

12. The system of claim 11, further comprising logic configured to increase the variable value n by one when the approximate error exceeds a predetermined maximum error.

13. The system of claim 12, further comprising logic configured to iterate the calculation of the approximate error until the estimated error in system variability is less that the maximum error or until all variables have been assigned a maximum number of levels.

14. The system of claim 13, further comprising logic configured to reduce an error budget by a predetermined amount when the error contributed by a single variable exceeds a maximum allowable error for any variable.

15. The system of claim 1, further comprising logic configured to simulate a designed experiment based on the variability of the output response.

16. The system of claim 15, further comprising logic configured to use the response data to provide a probability density function that predicts the probability that the output response falls within a specified range.

17. The system of claim 16, wherein the logic configured to use the response data to provide the probability density includes logic configured to graphically represent the probability densities.

18. The system according to claim 1, further comprising logic configured to assign values of the selected n values.

19. A method for estimating the probability density of a response variable, comprising:
building a customized designed experiment such that each input variable x for the designed experiment is assigned a number of variable values n based on the respective input variable's contribution p to overall response variability;
estimating, using a microprocessor, which n values of the input variable x are to be selected for use; and
evaluating the designed experiment to predict a probability density function of the response variable.

20. The method of claim 19, wherein building the customized designed experiment includes using a method of Gaussian quadratures to estimate which n values of the input variable x are used, and to estimate a weighting factor p to associate with each input variable x.

21. The method of claim 20, further comprising dynamically trying total system error ϵ, and for each value of ϵ iterating the number of variable values n for each variable x.

22. The method of claim 21, wherein dynamically trying total system error includes iterating the number of variable values n for each variable x until a contribution from each variable x to an error in system response variability is less than a trial value of ϵ, and a sum of all contributions to the estimate of system response variability is less than a multiple of ϵ.

23. The method according to claim 22, wherein the multiple of ϵ is two times ϵ.

24. The method of claim 20, further comprising utilizing Johnson fits for each input variable x to solve the method of Gaussian quadratures.

25. The method of claim 19, wherein the building the customized designed experiment includes using a plurality of moments of a random variable x to fit the data set to the probability density function.

26. The method of claim 25, wherein the using the plurality of moments includes sampling the input variable x at a few selected points to reproduce the moments.

27. The method of claim 26, wherein the few selected points are 6 or less selected points.

28. The method of claim 25, wherein the using the plurality of moments includes using a mean, variance, skewness or kurtosis of the random variable x.

29. The method of claim 18, further comprising using an area under a standard normal curve that falls outside a maximum z value as a measure of maximum error incurred in a decision to represent the variable x by n values, and multiplying the maximum error incurred by the variable's contribution p to determine an approximate error in the estimate of system variability attributable to the choice of the number of variable values n for the variable x.

30. The method of claim 29, further comprising increasing the variable value n by one when the approximate error exceeds a predetermined maximum error.

31. The method of claim 30, further comprising iterating the calculation of the approximate error until the estimated error in system variability is less that the maximum error or until all variables have been assigned a maximum number of levels.

32. The method of claim 31, further comprising reducing an error budget by a predetermined amount when the error contributed by a single variable exceeds a maximum allowable error for any variable.

33. The method of claim 19, further comprising simulating a designed experiment based on the variability of the output response.

34. The method of claim 33, further comprising using the response data to provide a probability density function that predicts the probability that the output response falls within a specified range.

35. The method of claim 34, wherein using the response data to provide the probability density includes graphically representing the probability densities.

36. The method according to claim 19, further comprising assigning values of the selected n values.

37. A computer program embodied on a computer readable medium for implementing a point estimation method (PEM) that predicts variability of a system output response based on variabilities of inputs, comprising:

code configured to build a customized designed experiment such that each input variable x for the designed experiment is assigned a number of variable values n based on the respective input variable's contribution p to overall response variability; and code configured to estimate which n values of the input variable x are to be selected for use.

* * * * *